June 12, 1962     E. M. GREER     3,038,501
PRESSURE VESSEL
Filed Dec. 5, 1957
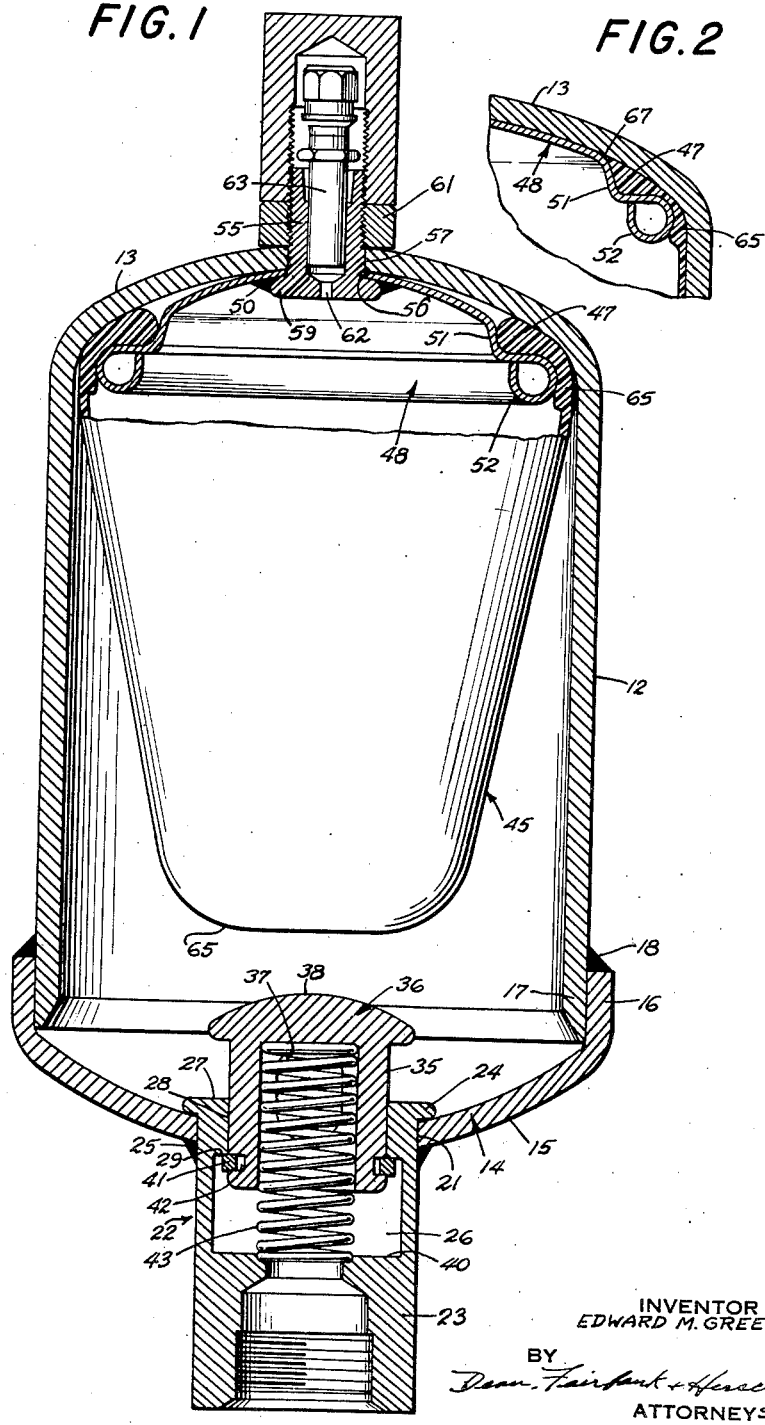
INVENTOR
EDWARD M. GREER
BY
ATTORNEYS.

United States Patent Office 3,038,501
Patented June 12, 1962

3,038,501
PRESSURE VESSEL
Edward M. Greer, Great Neck, N.Y., assignor to Greer Hydraulics, Inc., a corporation of New York
Filed Dec. 5, 1957, Ser. No. 700,783
2 Claims. (Cl. 138—30)

It is among the objects of the invention to provide a pressure vessel such as a pressure accumulator which is strong and durable and not likely to break down and which may readily be manufactured from relatively inexpensive components without the need for precise tolerances or precision work requiring highly skilled workers.

According to the invention these objects are accomplished by the arrangement and combination of elements hereinafter described and particularly recited in the claims.

In the accompanying drawings in which are shown one or more of various possible embodiments of the several features of the invention, FIG. 1 is a longitudinal sectional view of one embodiment of the invention with the accumulator bladder partially charged, and FIG. 2 is a detail view showing the position of the clamp plate with the accumulator bladder fully charged.

Referring now to the drawings, the pressure accumulator comprises a container 12 formed from a cylindrical shell having a curved end wall 13, and a cap 14 also having a curved end wall 15 and having its side wall 16 telescoped over the open end 17 of container 12 and secured thereto as by welding as at 18.

The cap has an axial opening 21 in its end wall 15 in which is mounted a closure member 22 which controls the flow of fluid from the container.

The closure member 22 comprises a cylindrical body portion 23 of diameter slightly less than that of opening 21 so that it may extend therethrough and has a lateral flange 24 at one end adapted to seat against the inner periphery of opening 21 to prevent outward movement of the closure member from the accumulator. The closure member may be restrained from inward movement in any suitable manner and in the illustrative embodiment, this is accomplished by welding as at 25.

The body portion 23 has an axial bore 26 extending from its inner end 27 and said bore is of reduced diameter as at 28 near its inner end defining an annular shoulder 29.

Slidably mounted in bore 26 is a sleeve 35 which is of outer diameter substantially equal to that of the reduced diameter portion 28 of bore 26 so that it may slide therein with substanitally no transverse play. The sleeve 35 is closed at its inner end as at 36 defining a valve head and has a plurality of openings 37 leading thereinto adjacent said valve head 36 for flow of fluid. The valve head desirably is rounded as at 38 and is of diameter greater than that of sleeve 35 so that it may seat on the inner end 27 of the body portion to shut off flow of fluid from the container.

The sleeve 35 is retained in the bore 26 and its inward movement is limited by means of a split snap ring 41 positioned in an annular groove 42 in the periphery of sleeve 35 near its outer end and extending laterally from said groove so as to abut against the shoulder 29.

The sleeve is normally urged into the container by means of a coil spring 43 compressed between floor 40 of bore 26 and the valve head 36 so that openings 37 are exposed for flow of fluid.

The closure member 22 is assembled by placing the snap ring 41 in groove 42 of sleeve 35 and the coil spring 43 in the bore of the sleeve. The snap ring, which will tend to move out of groove 42, is forced into such groove and the sleeve is then pressed into the bore 26 of the body portion 23 against the tension of coil spring 43. When the snap ring 41 passes shoulder 29 it will move slightly out of groove 42 and its outer periphery will be retained against shoulder 29 by the tensed coil spring 43 to limit the movement of the sleeve into the container.

The pressure accumulator is provided with a partition 45, illustratively a bladder of resilient material which is substantially conical as shown. To retain the bladder in the container, a clamp plate 48 is provided which desirably is of flexible sheet metal. The plate 48 has a curvature generally corresponding to the curvature of the end wall 13 and has an annular depression 51 adjacent its periphery, the latter desirably being reversely bent as at 52 to impart rigidity to the plate.

The clamp plate 48 is securely retained against end wall 13 by means of a plug 55 which extends through aligned axial openings 56, 57 in plate 48 and end wall 13 and when so retained, as shown in FIG. 1, the surface of the clamp plate 48 adjacent its periphery and inwardly thereof will be spaced from the opposed surface of end wall 13.

The plug 55 has a flange 59 at its inner end which seats on the periphery of opening 56 and is desirably welded thereto as at 50 and is externally threaded at its outer end to receive a nut 61 which when tightened will securely retain the portion of clamp plate 48 around its axial opening against end wall 13.

The thickened bead 47 at the mouth of the bladder 45 is positioned in said annular depression 51 and as the diameter of the plate 48 is greater than that of the mouth of the bladder, the mouth portion of said bladder will snugly engage the reversely bent periphery of said plate.

The portion 65 of the bladder adjacent the thickened rim 47 is of greater thickness than the side wall portion of the bladder for the purpose hereinafter set forth.

To charge the bladder 45 with fluid such as a gas under pressure, a passageway 62 is provided through plug 55. The passageway is provided with a valve 63 to retain the bladder charged.

To assemble the accumulator, the plate 48 is positioned in the mouth of the bladder with the bead 47 seated in annular depression 51. The plug 55 is then inserted through opening 57 in end wall 13 and nut 61 tightened securely to retain the clamp plate in position.

When so retained, the portion of the clamp plate 48 adjacent its outer periphery will be spaced from the opposed surface of the end wall 13 and such portion of plate 48 adjacent its outer periphery will exert little pressure against the bead 47 of bladder 45.

The cap 14 with the closure assembly mounted thereon is positioned over the end 17 of the shell 12 and welded in place.

The bladder 45 is then charged with gas under pressure through the valve 63. As the accumulator shell externally of the bladder is initially devoid of fluid, the bladder will expand to fill the shell, the abutment of the end 65 of the bladder against the valve head 36 as the bladder expands, moving the latter against its seat 27 to prevent extrusion of said bladder.

As the pressure in the bladder is much greater than that in the shell which is initially at atmosphere pressure, pressure will be exerted against the flexible plate 48 so that it will be deflected toward the end wall 13. As a result, the bead portion 47 of the bladder will be compressed against the end wall 13 and securely retained thereagainst as shown in FIG. 2.

When the accumulator is charged with oil, for example, through the bore 26, the bladder 45 will be compressed as will be the gas therein. The accumulator in this condition is ready for use.

When the accumulator is so charged, the pressure on the oil and the gas will be substantially equal. However, as the bead 47 has been previously pressed against end wall 13 when the bladder was initially charged with gas, the region between the portion of plate 48 inwardly of bead 47 and the adjacent surface of end wall 13 will be at a pressure considerably less than that of the gas and oil in the container. As a result of the differential pressure against plate 48 and bead 47, the plate will be securely retained against end wall 13, securely to retain the bead 47 of the bladder against said end wall so that it will not be dislodged from anular depression 51. In addition, the differential pressure will force the bead 47 into the corner 67 defined by end wall 13 and plate 48 to provide a highly effective seal that will prevent leakage of gas or oil from the accumulator.

In operation of the accumulator, when the oil port or bore 26 is opened by a suitable valve (not shown) the compressed bladder 45 will expand and elongate to force oil from bore 26 until the end 65 of the bladder 45 engages valve head 36 to move the latter against its seat 27 to seal the bore 26.

As the bladder elongates, tension will be applied to its side wall. However, as the portion 65 of the side wall adjacent the bead 47 is of greater thickness, the greater part of the elongation or stretching of the side wall will occur along its smaller thickness region and little stretching will occur at the thickened portion 65. As a result, the tension applied to bead 47 will be small so there will be little or no tendency of the bead 47 being pulled out of annular depression 51 with resultant failure of the unit.

If the clamp plate was rigid it would have to conform accurately to the curvature of the end wall 13, and even with extreme care in manufacture, which would greatly increase the cost of the unit, tolerances cannot be held to precise values, and leakage might occur past the bead 47.

With the construction above described, a pressure vessel is provided that may readily be fabricated at low cost from relatively inexpensive components and is not likely to become out or order even with long use. By reason of the flexible clamp plate, it does not have to conform accurately to the curvature of end wall 13 to hold the bladder in position for as it is normally spaced from end wall 13, the pressure against the plate 48 will securely retain the bead 47 against said end wall to provide a dependable seal.

As many changes could be made in the above construction and many apparently widely different embodiments of this invention could be made without departing from the scope of the claims, it is intended that all matter contained in the above description, or shown in the accompanying drawings, shall be interpreted as illustrative and not in a limiting sense.

Having thus described my invention, what I claim as new and desire to secure by Letters Patent of the United States is:

1. A pressure vessel comprising an elongated container having a curved end wall having an axial port and a substantially cylindrical side wall, an elongated resilient and deformable bladder in said container having an enlarged mouth and being of length when undistended less than the length of said container and adapted when expanded to stretch to substantially the length of said container, a clamp plate of flexible material in said container, said clamp plate being of diameter greater than that of the mouth of the bladder and having an axial opening aligned with said axial port, means extending through said port securely to retain the portion of the clamp plate adjacent the axial opening therein against the portion of the curved end wall of the container adjacent said port, said clamp plate being curved and the remaining portion thereof spaced from the portion of the curved end wall outwardly of said port, said clamp plate being positioned in the mouth of said bladder which depends from said plate, the mouth of said bladder having a thickened rim, said clamp plate having an annular depression adjacent its periphery to receive said thickened rim, the periphery of said clamp plate being positioned adjacent the junction between the curved end wall and the cylindrical side wall of said container, the portion of the bladder adjacent its mouth when its thickened rim is in said depression forming substantially a right angle with respect to the adjacent portion of said bladder.

2. The combination set forth in claim 1 in which the periphery of said clamp plate outwardly of said depression is reversely bent inwardly, the thickness of the bladder wall adjacent said thickened rim being greater than the thickness of the adjacent portion of said bladder wall, and said reversely bent periphery of said clamp plate is positioned to react against such thickened portion of the bladder wall, the portion of said plate inwardly of said depression acting as a stop to limit compression of said thickened portion when the vessel is under pressure.

References Cited in the file of this patent
UNITED STATES PATENTS

| | | |
|---|---|---|
| 2,550,892 | Weber et al. | May 1, 1951 |
| 2,578,730 | Nicholson et al. | Dec. 18, 1951 |
| 2,880,759 | Wisman | Apr. 7, 1959 |
| 2,886,064 | Mercier | May 12, 1959 |
| 2,931,392 | Mercier | Apr. 5, 1960 |